July 29, 1969 TAKEO MUKAI 3,457,895
DEVICE FOR MACHINING AND TREATING THE INNER WALLS OF A TUBULAR BODY
Filed Aug. 5, 1966 2 Sheets-Sheet 1
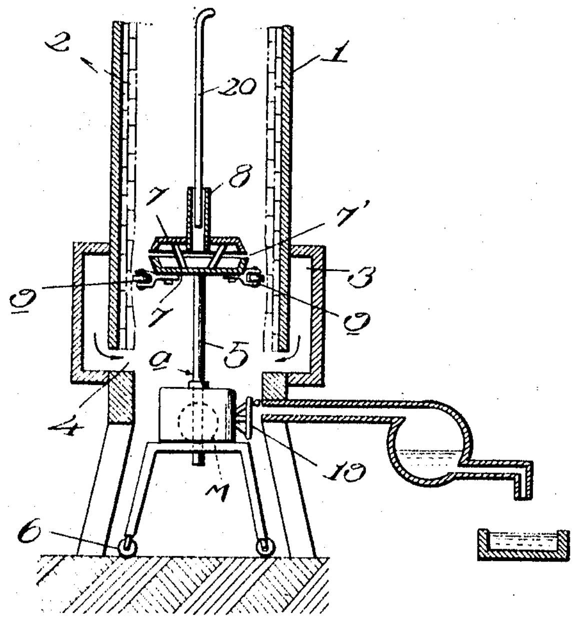
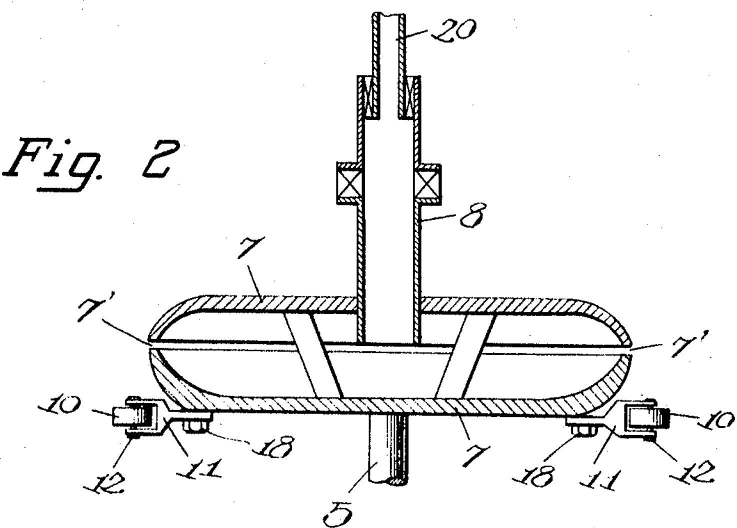
INVENTOR.
Takeo Mukai
BY
Michael S. Striker
Attorney Fig. 3
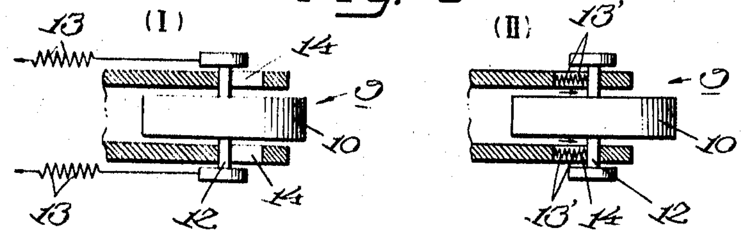
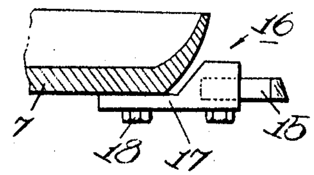
Fig. 4
Fig. 5
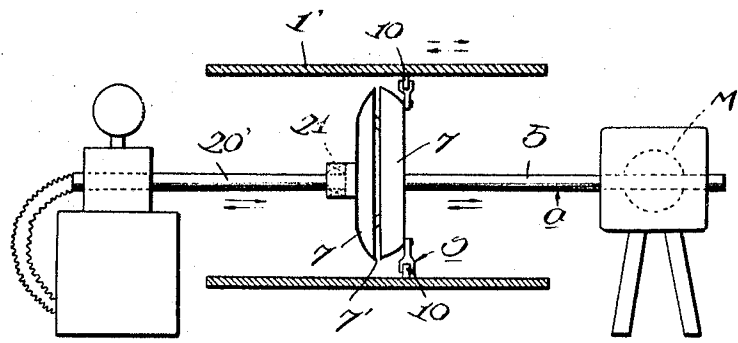
INVENTOR.
Takeo Mukai
BY
Michael S. Striker
Attorney United States Patent Office 3,457,895

Patented July 29, 1969

1

3,457,895

DEVICE FOR MACHINING AND TREATING THE INNER WALLS OF A TUBULAR BODY

Takeo Mukai, 553 Mure Mitaka, Tokyo, Japan

Filed Aug. 5, 1966, Ser. No. 570,576
Int. Cl. B05c *7/02, 11/02*
U.S. Cl. 118—72 6 Claims

ABSTRACT OF THE DISCLOSURE

The invention relates to a device for treating the inner wall of a tubular body and comprises a support carrying a motor and a rotary shaft which shaft is operatively connected to the motor and is axially movable in the tubular body to be treated and which shaft carries a rotary member having means for treating the inner wall of the tubular body which treating means can be a tool or means for coating the interior wall of the body.

This invention relates to a device for machining and treating the inner walls of a tubular body.

An object of the present invention is to provide a device for machining and treating the inner walls of a tubular body having a high-speed rotary disk which can perform efficiently and finely the above operations including scraping and coating.

Other object of the present invention is to provide a device for machining and treating the inner walls of a tubular body, which can achieve its object operations without regard to any batter of the body.

Another object of the present invention is to provide a device for machining and treating the inner walls of a tubular body having the afore-mentioned high-speed rotary disk provided with scrapers or rollers and the like at its periphery.

Further another object of the present invention is to provide a device for machining and treating the inner walls of a tubular body, wherein a coating material supplied into the inner central part of the rotary disk is sprayed toward the walls by a centrifugal force generated with the high-speed rotation of the disk, and the walls thus coated with the coating material is finished by rolling with the rollers provided to the periphery of the disk so that they have regular radii.

Further another object of the present invention is to provide a device for machining and treating the inner walls of a tubular body, wherein the scrapers provided to the rotary disk scrape off various kinds of refuses such as refuse metals and refractories in a cupola, which stick around the inner walls of such tubular body during the operation thereof.

A further object of the present invention is to provide a device for machining and treating the inner walls of a tubular body, members of which are remotely controlled so that they can work even in tubular bodies having a reduced diameter or complex bends.

In consideration of the above objects and other objects to be mentioned in the succeeding specification, preferred embodiments of the present invention device will be described with reference to the accompanying drawings.

In the drawings;

FIG. 1 is a longitudinal cross section of the present invention device which is placed vertically in a furnace such as a cupola, FIG. 2 is an enlarged view of FIG. 1 in its part, which is partly cut open, FIGS. 3(I) and (II) are cross sections illustrating two embodiments of roller member of the device, which are shown only in its principal parts,

2

FIG. 4 is a cross section illustrating the principal part of scrape member of the device, and FIG. 5 is an explanatory view showing another application of the present invention device, in which the device treats the inner walls of a tubular body placed horizontally.

In the drawings, especially FIGS. 1 through 4, the inner walls of a tower-like furnace 1 are built of fire bricks 2 which are laid in layer. A heated air supplying member 3 which is provided around the outer wall of the furnace 1, supplies into the furnace a highly heated air through inlets 4. A device *a* for machining and treating the inner walls of the furnace 1 is removably placed in the furnace by means of rollers 6 fitted to the bottom of the device *a*. To a rotary shaft 5 which is rotated by an electric motor M at a desired speed, a rotary disk 7 is fitted. Said rotary disk 7 is consisted of, as illustrated in FIG. 2, a pair of saucer-like parts 7′, 7′ which face each other with an annular slit opening 7″ therebetween.

A refractory material such as a fire clay supplied into the disk 7 from an inlet tube 8 which is fitted at the center of the upper saucer-like part 7′, is mixed with a water which is also supplied from the tube 8, and sprayed out from the slit opening by the centrifugal force produced with the rotation of the disk. To both of the saucer-like parts 7′, 7′ of the rotary disk 7, or one of them is provided a roller member 9 which comprises one or more pairs of bifurcated arms 12 fitted at their one ends to the saucer-like parts 7′, 7′ along their peripheral edges and extending at their other ends outwardly and slightly downwardly, and rollers 10 fitted to axes which are pivoted to the bifurcated arms 11. Said rollers 10 act to press refractory materials sprayed out from the slit opening 7″ of the rotary disk onto the inner walls of the furnace 1, and to finish the surface of the walls.

In FIGS. 3(I) and (II), the axes 12 are rotatably received by slits 14 and horizontally slidable within the slits. By means of springs 13 which normally draw the axes, as shown in FIG. 3(I), toward the center of the disk 7, or springs 13′ which normally press the axes outwardly as shown in FIG. 3(II), the rollers 10 can come in contact with the inner walls under an adequate pressure in accordance with the rotary velocity of the rotary disk 7, or the quantity and quality of the refractory materials to be applied.

A scrape member 18 comprising a scraping tool such as a cold chisel may take the place of the roller member 9, so that said member can scrape off refuse metals and the like which stick around the inner walls of the furnace 1. Said member 18 comprises, as illustrated in FIG. 4, an arm 17 tightly fixed to the saucer-like part 7′ by a screw 18, and a cold chisel 15 slidably fitted to the arm 17.

The rotary shaft 5 of the device *a* is vertically, that is, axially movable by the operation of a handle 19 so that the rotary disk 7 fitted to the shaft can vertically travel along the inner walls of the furnace. To the inlet tube 8 is connected a lead pipe 20, through which a desired coating material is fed by gravity into the rotary disk continuously.

The function and operation of the present device having the above described structures will be explained the following.

In a furnace such as a cupola, fire-bricks laid along its inner walls are decomposed especially near at its bottom portions, as illustrated by chained lines in FIG. 1, through repeated operations thereof, and they moulder. However, it is not proper to treat the surface of such decomposed bricks directly without predisposing them, because a considerable amount of residumn of refractory materials such as cokes tightly adheres to the decomposed surface of the bricks. Hence, in the first step, such residumn of refractory materials are scraped off by means of the cold chisels 15 fitted to the rotary disk 7, rotary shaft 5 of which is rotated by the motor M at a high speed and reciprocates vertically along its axis. In the second step, into the rotary disk which is fitted with the roller member 9 in place of the cold chisel, a coating material and water are supplied through the lead pipe 20, and said rotary disk is rotated to spray out from the annular slit opening 7'', by the centrifugal force working to the disk, the coating material and water which are mixed up with the rotation of the rotary disk. The mixture of coating material and water sprayed out from the disk onto the battered inner walls of the tubular body increases its thickness with the rotary and reciprocating movement of the rotary disk which sprays out the mixture continuously. When the thickness of the mixture sprayed onto the wall reaches to a certain extent, the rollers 10 of the roller member 9 start to further press the mixture into hollow and battered parts of the wall and trowel the surface thereof, resulting in finishing the walls into an uniform cylindrical body having the inner walls of a radius corresponding to the length of the roll members. The reciprocating movement of the rotary disk may be made automatically by a device provided outside the furnace.

Another application of the present device is illustrated in FIG. 5, in which an ordinary tubular body is treated by the device. Into a tubular body which is placed horizontally, the device 1' is placed also horizontally in such a way that the rotary shaft fitted to the rotary disk 7''' at its one end is made coaxial with the longitudinal central axis of the body 1'. To an inlet tube 8' fitted to the rotary disk 7''' at its another end, a lead pipe 20' is connected through a bearing 21, which supplies coating materials into the rotary disk under a pressure. Either the rotary disk, or the tubular body itself can be moved horizontally in the application illustrated in FIG. 5.

Through the above description, it will be appreciated that the present device having the above-described constructions can well perform the afore-mentioned objects by means of the centrifugal force working on the coating material supplied into and stored in the rotary disk, and roller member and/or scrape member which finish or predispose the inner walls of a tubular body after or before the coating material is sprayed out by said centrifugal force from the rotary disk onto the walls.

What is claimed is:

1. A device for treating the inner surface of a tubular body having an axis comprising, in combination, a support; a stationary motor carried by said support; a rotary drive shaft carried by said support and driven by said motor, said rotary drive shaft extending along said axis of said tubular body into the latter and being movable in direction of said axis relative to said body and to said support; a rotary member carried by said shaft for rotary and axial movement therewith and having at least one opening in the periphery thereof; an inlet tube communicating with the interior of said rotary member for supplying a coating material to be projected from said opening toward the inner surface of said tubular body; tool means connected to said shaft for rotary and axial movement therewith and for treating said inner surface; and operating means for moving said rotary shaft along the axis of said tubular body.

2. A device as defined in claim 1, wherein said tool means comprise roller means for rolling down and finishing the coating material projected through said opening of said rotary member against said inner surface.

3. A device as defined in claim 2, wherein said roller means are carried by said rotary member movable in axial direction relative thereto and including biassing means for biassing said roller means in radially outward direction.

4. A device as defined in claim 1, wherein said tool means comprise scraper means for scraping said inner surface.

5. A device as defined in claim 4, wherein said scraper means is carried by said rotary member projecting beyond the periphery of the latter.

6. A device as defined in claim 1, wherein said rotary member comprises two cup-shaped parts spaced in axial direction from each other and wherein said opening is defined by an annular gap between end edges of said cup-shaped parts.

References Cited

UNITED STATES PATENTS

| | | | |
|---|---|---|---|
| 1,193,361 | 8/1916 | Crepeau | 15—104.09 |
| 1,833,497 | 11/1931 | Prouty | 118—317 X |
| 2,140,298 | 12/1938 | Miller. | |
| 2,168,917 | 8/1939 | Perkins | 118—317 X |
| 2,233,855 | 3/1941 | Suss | 239—223 |
| 3,226,258 | 12/1965 | Heist | 15—104.1 X |
| 2,336,946 | 12/1943 | Marden et al. | 118—308 X |

WALTER A. SCHEEL, Primary Examiner

JOHN P. McINTOSH, Assistant Examiner

U.S. Cl. X.R.

25—38; 118—105, 306, 323